United States Patent [19]
Berry

[11] 3,727,926
[45] Apr. 17, 1973

[54] SEALING GASKET AND SEALED JOINT USING THE SAID GASKET

[75] Inventor: Jean-Luc Berry, 27 Mesnil sur L'Estree, France

[73] Assignee: E. P. Remy et Cie, Dreux, France

[22] Filed: July 29, 1971

[21] Appl. No.: 167,308

[30] Foreign Application Priority Data

Aug. 6, 1970 France..................................7029083

[52] U.S. Cl. ..............................277/212 F, 285/350
[51] Int. Cl. ..............................................F16j 15/10
[58] Field of Search......................285/349, 350, 336; 277/212, 212 F, 11, 187, 188, 215

[56] References Cited

UNITED STATES PATENTS 696,183   3/1902   McAuliffe..........................277/212 F
3,406,409   10/1968   Burns..................................277/212

*Primary Examiner*—George E. Lowrance
*Assistant Examiner*—Robert I. Smith
*Attorney*—Kenyon & Kenyon Reilly Carr & Chapin

[57] ABSTRACT

The invention relates to a sealed joint comprising a first and a second member between which is formed a substantially L-shaped cross-sectional recess in which is placed a gasket which has a corresponding L-shaped cross-sectional section.

The gasket and the recess are so formed that a continuous and excellent sealing is provided between the two members and the gasket, and that no excessive compression or deformation of the gasket is to be feared.

5 Claims, 3 Drawing Figures

PATENTED APR 17 1973  3,727,926

INVENTOR
JEAN-LUC BERRY
BY
Kenyon & Kenyon Reilly Carr & Chapin
ATTORNEYS

SEALING GASKET AND SEALED JOINT USING THE SAID GASKET

The present invention relates to a sealing gasket having a novel structure and adapted to be used in all cases where the known sealing gaskets are usable however, the sealing gasket according to the present invention is more particularly adapted to be used to preserve the fluid-tightness of functional spaces with respect to one another or with respect to the atmosphere, so as to preserve in the said functional spaces specific aseptic conditions while at the same time ensuring easy cleaning and especially, even during operation, efficient and easy sterilization of the region of the said gasket in the functional space protected by the latter.

The invention also relates to the complete sealed joint, i.e. the assembly formed by the sealing gasket and the two parts or members between which the gasket is placed. It also has for its object the assembly performed by the sealing gasket and that of the two parts or members in which it is encased.

The sealing gasket according to the present invention is characterized in that it is substantially L-shaped in cross section, a first arm of this L-shaped gasket ending with right angles, whereas its second arm ends with a round profile portion.

According to one feature of the present invention, the said round profile portion involves the whole region of the said second arm of the L-shaped gasket starting from its end down to the internal corner of the said L-shaped gasket.

According to another feature of the present invention, the ratio of the thicknesses of the two arms of the L-shaped gasket is comprised between about 1/2 and 2/1.

The aforesaid sealing gasket is intended to be placed in a recess of one of the said parts or members, called hereinafter "first member", the said recess being characterized in that it opens in the functional space to be sealed and that it is constituted, on the one hand, by a hollow communicating with the said space and, on the other hand, by a groove deeper than the said hollow and adjacent thereto, the respective dimensions and shape of the said recess and the said sealing gasket being so selected as to meet the following conditions:

the first arm of the L-shaped gasket, ending with right angles, is aligned with the surface of the said first member in contact with the said functional space;

the bottom of the said groove has a round profile, the radius of curvature of which is greater than the radius of curvature of the said portion of the second arm of the L-shaped gasket;

the external face of the first arm of the L-shaped gasket projects with respect to the surface of the said first member, intended to come into contact with a corresponding surface of the second member, over a height corresponding to a small fraction of the thickness of the said first arm.

It will be understood that, under said conditions, by applying the second member on the first member, on the side of the surface of the latter from which the external face of the first arm of the L-shaped gasket projects, the sealing is achieved as a result of the compression of the L-shaped gasket in the following manner:

only the first arm of the L-shaped gasket is compressed between the second member and the said recess;

the second arm of the L-shaped gasket is practically not compressed in its portion located within the groove of the said recess, owing to the possibility of expansion due to the presence of a space between the round profile of this portion and the round profile, having a greater curvature, of the groove bottom;

the whole of the external face of the first arm of the L-shaped gasket comes into contact with the second member, thus ensuring a large sealing surface;

the relatively small tightening or clamping effort is sufficient, owing to the fact that fluid-tightness between the gasket and the first member is ensured only on a relatively small surface corresponding to the internal face of the first arm of the said gasket, in spite of the extent of the contact surface between the gasket and the second member.

Moreover, it is very important to point out that the very shape of the sealing gasket and of its recess ensures excellent centering of the joint during its compression, resulting in maximum efficiency of the joint.

The joint according to the present invention can be made from any suitable material, for instance plastics, natural or synthetic rubber, etc.

Other features and advantages of the present invention will appear as the following description proceeds.

In the appended drawing given solely by way of example:

Figure 1:
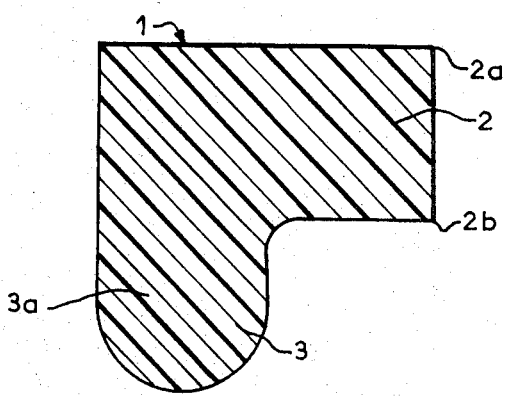
FIG. 1 is a cross-sectional view of a sealing gasket according to the present invention.

Referring to FIG. 1, it is seen that the L-shaped sealing gasket 1 according to the present invention comprises a first arm ending with two right angles 2a and 2b, and a second arm 3 ending with a round portion 3a in the shape of a semi-circle. In the example considered, the said portion has a constant radius of curvature of, for instance, 1.5 millimeter, the radius of curvature of the round portion of the groove into which the second arm 3 of the sealing gasket is intended to be engaged, being slightly greater (for instance equal to 1.6 millimeter).

The sealing gasket whose shape has just been described may extend longitudinally or have an annular shape, notably a circular shape, or it may extend along an open or closed loop path or circuit of any shape, for instance rectangular.

Figure 2:
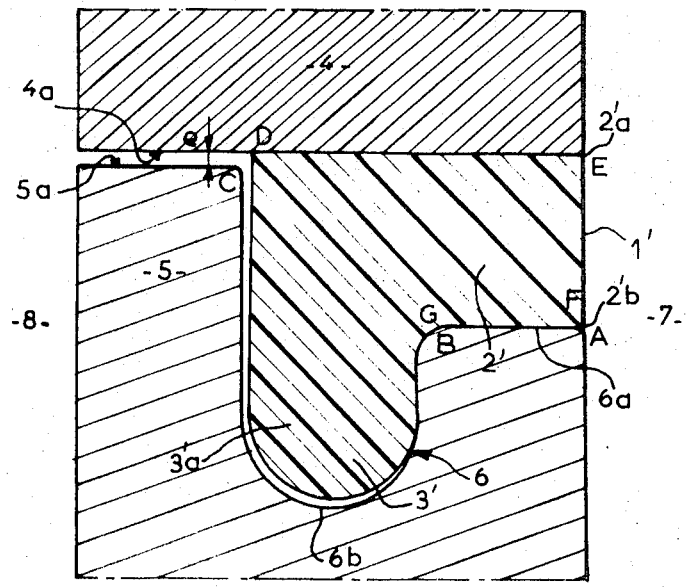
FIG. 2 is a cross-sectional view of a joint according to the present invention, using a sealing gasket of the aforesaid type.

Referring to FIG. 2, it is seen that reference digits 4 and 5 indicate respectively the first member and the second member, between which is adapted the sealing gasket 1' having the same general features as gasket 1 of FIG. 1. It will be noted that the member 5 is provided with a recess 6 for the sealing gasket 1', the said recess consisting of a hollow 6a and a groove 6b, the bottom or the whole of which has a round profile, the curvature of the said bottom being greater than the curvature of the portion 3'a of the second arm 3' of the sealing gasket; in the same manner as in the case of FIG. 1, both curvatures may be constant and have different radii and one and the same center, or they may not be constant and/or have different centers, so as to confer to the free space comprised between the round portion 3'a and the groove bottom a progressively increasing thickness towards the groove bottom instead of having a constant thickness as shown in FIG. 2.

It is seen that the external face DE of the first arm 2' of the gasket comes into contract with the second member 4 over its whole length, i.e. from D to E, and that the said face projects with respect to the surface 5a of member 5, by a height e corresponding to a small fraction of the total thickness of the said arm 2', thus enabling the faces 4a and 5a of the members 4 and 5 to be brought into mutual abutment when the sealing gasket is compressed as a result of the tightening of the joint.

In FIG. 2 the joint is shown in the untightened position, i.e. the sealing gasket 1' is at rest.

During the tightening of the joint, only that portion of the sealing gasket which is in contact with the face AB (i.e. the wall of the recess 6a) of the first member 5 is really compressed, whereas the sealing gasket portion 3'a located in the groove 6b is practically not compressed; such a joint ensures excellent centering owing to the fact that the difference in the curvatures of both said portions permits the sealing gasket to assume by itself a position of maximum seat without being shifted from its vertical position owing to the bearing taken by the first arm 2' on the face AB.

In spite of the large contact surface DE between the sealing gasket and the member 4, the tightening effort is relatively small owing to the smallness of the contact face AD between the gasket and the member 5.

This joint is compatible with a tightening defined mechanically by bringing the bottom 4a into contact with the surface 5a.

The sterile functional space to be protected from the external atmosphere 8, which is a source of contamination, is shown at 7. Considering the functional space 7 to be a conduit for a fluid, in which case the joint and its gasket have annular structures, it is seen that neither deposits of substance nor turbulence can occur within the said conduit in the region of the joint, for the face EF of the sealing gasket is practically not deformed owing to the relatively small compression effort and to the possibility of expansion of the gasket in the groove bottom 6b, and therefore practically no variation of the section of the said conduit can take place. It will be noted that the situation would be different if the shape of the sealing gasket and the space occupied by the latter were such that the said gasket, having for instance a square section, should occupy only the recess 6a located above the face AB of the member 5.

Figure 3:
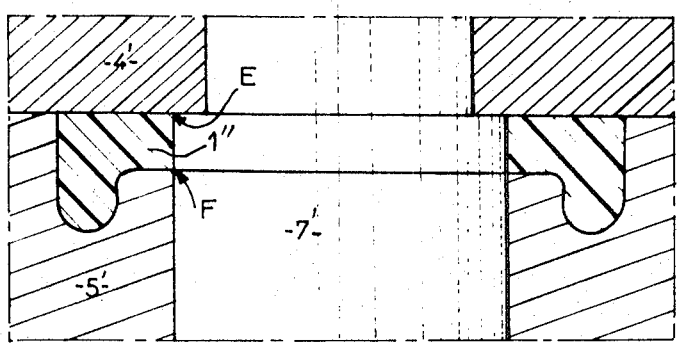
FIG. 3 is a modification of the joint of FIG. 2, according to the invention.

Owing to the very absence of deformation of the face EF of the sealing gasket 1', the gasket can be readily cleaned, in particular it can be treated by means of a cleaning antiseptic fluid circulating in the functional space 7, without having to disassemble the joint, even if the space 7 is constituted by a conduit whose lateral wall comprises an offset at the level of the joint as shown for instance in FIG. 3.

Indeed, it is seen in FIG. 3 that the member 4' is thicker than the member 5', so that a right-angled reinforcement is provided within the channel 7' at the level of the region of the circular gasket 1''. However, the considerable reduction of the section of the conduit 7' does not hinder the cleaning of this region owing to the fact that, considering the absence of substantial deformation of the internal face EF of the sealing gasket, the right-angled profile of the said reinforcement is not modified, whereas an acute-angle profile resulting from a deformation of the joint, as happens with the usual joints, would render the cleaning of the said region more difficult and less efficient.

In case of use of such a joint in systems which are to be sterilized or maintained sterile and through which food products are to be conveyed, such a joint must meet for instance the following conditions:

they must withstand temperatures of from 0° to 140°–150° C;

they must withstand the action of various detergent solutions whose temperature may range from 0° to 100° C;

they must withstand the action of antiseptic agents such as for instance ethylene glycol, especially at high temperatures on the order of from 120° to 150° C;

they must not have any harmful action on the food products being treated, for instance milk and milk products at 0° to 100° C and fruit juice at 0° to 100° C.

Materials meeting the aforesaid conditions are, for instance, butyl or nitrile rubbers.

Of course, depending on the specific conditions of use of the joint, the sealing gasket may be made from various materials selected notably among natural or synthetic rubbers, plastics, etc.

The present invention is by no means limited to the forms of embodiment described and illustrated, which have been given by way of example only. In particular, it comprises all the means constituting technical equivalents to the means described as well as their combinations, should the latter be carried out according to the spirit of the invention.

What is claimed is:

1. Sealed joint comprising a sealing gasket, a first member and a second member, delimiting a space to be protected, said first member comprising a rib on which bears said second member, a free space being formed in said first member adjacent said rib leaving between said first and said second member a substantially wide L-shaped cross-sectional recess an arm of which is formed by a groove formed in said first member and the second arm of which is formed by a hollow or gap comprised between said first and said second member ending in said groove and opening inside said space to be protected, said gasket having a substantially wide L-shaped cross-sectional configuration, a first arm of the said L-shaped gasket ending with right angles, and the second arm thereof ends with a round profile portion, the said hollow being intended to receive the first arm of the L-shaped gasket, whereas the said groove is intended to receive the second arm of the said L-shaped gasket, the bottom of the said groove having a round profile the radius of curvature of which is greater than the radius of curvature of the end portion of the said second arm of said gasket, so that when the said gasket is tightened between the said two members, the said portion may freely expand in the bottom of the said groove.

2. Sealed joint according to claim 1, wherein the end face of the first arm of the said L-shaped gasket, on the side opposite to that of the corner of the said L-shaped gasket, is in alignement with the free adjacent surface of the said first member.

3. Sealed joint according to claim 1, wherein the external face of the said first arm of the L-shaped gasket in the non compressed state projects with respect to the surface of said rib of said first member, over a height corresponding to a small fraction of the thickness of the said first gasket arm.

4. Sealed joint according to claim 1, wherein the external face of the said first gasket arm is in contact with the second member down to the external corner of the L-shaped gasket.

5. In an annular gasket having a substantially L-shaped cross-sectional configuration, an inwardly extending arm having a free end which is planar and is at right angles to the arm and a second arm having a free end which is rounded in the shape of a semi-circle, said arms being transitioned by an internal round profile and the ratio of the thicknesses of the said first and second arms being comprised between 1/2 and 2/1.

* * * * *